Aug. 31, 1943.   K. W. HARPER ET AL   2,328,211

MICROSCOPE

Filed April 2, 1941

INVENTOR
KENNARD W. HARPER
ERWIN O. ROEDER
BY
Raymond A. Paquin
ATTORNEY

Patented Aug. 31, 1943

2,328,211

UNITED STATES PATENT OFFICE 2,328,211

MICROSCOPE

Kennard W. Harper, East Aurora, and Erwin O. Roeder, Ebenezer, N. Y., assignors to Spencer Lens Company, Buffalo, N. Y., a corporation of New York Application April 2, 1941, Serial No. 386,467

2 Claims. (Cl. 88—39)

This invention relates to improvements in microscopes and has particular reference to a new and improved stop adjustment to prevent damage to the objective or to the front lens of the substage condenser during use of the instrument.

An object of the invention is to provide a micrometer stop adjustment whereby the downward movement of the microscope body tube and objective may be limited to prevent the objective from hitting the upper surface of the front lens of the substage condenser and causing damage to said objective or to said front lens or both.

Another object of the invention is to provide a micrometer stop adjustment for adjustably limiting the downward movement of the microscope body tube and objective wherein the limit of downward movement of said body tube and objective may be adjusted to prevent the objective from hitting slides on the microscope stage and breaking the same.

Another object of the invention is to provide a simple, efficient and economical micrometer stop adjustment for adjustably limiting the downward movement of the microscope body tube and objective whereby the same may be easily and quickly adjusted to compensate for variations in dimension in the manufacture of the various parts of the instrument.

Other objects and advantages of the invention will become apparent from the following description taken in connection with the accompanying drawing. It will be understood that many changes in the details of construction and arrangements of parts may be made without departing from the scope of the invention as expressed in the accompanying claims. We therefore do not wish to be limited to the exact details of construction and arrangements of parts shown and described as the preferred forms have been shown by way of illustration only.

Referring to the drawing.

In the use of microscopes it is necessary that the assembly consisting of the body tube, objective, and eyepiece be adjusted to properly focus these parts for viewing the object under inspection. In the adjustment of the body tube and objective particularly by inexperienced operators such as students or the like, it has frequently resulted that the lower end of the objective would be lowered too far and accidentally hit the front or upper lens of the substage condenser and either dislocate the front lens of the objective or the front lens of the condenser or break one of these lenses, making necessary expensive repairs. The number of such accidents has been large and for this reason attempts have been made to provide stops for limiting the downward movement of the body tube and objective to eliminate such accidents. However, such stop devices have been fixed and did not take into consideration or compensate for the variations in manufacture of the parts and for this reason the construction was not effective in a large number of cases to prevent such accidents as described above. It is therefore one of the principal objects of the present invention to provide a micrometer stop adjustment for limiting the downward movement of the microscope body tube and objective which adjustment may be adjusted to compensate for variations in the dimensions of parts of the instrument in the manufacture thereof and when adjusted will positively prevent accidental damage to the front lens of the substage condenser or front lens of the microscope objective in the manner described above.

Figure 1:
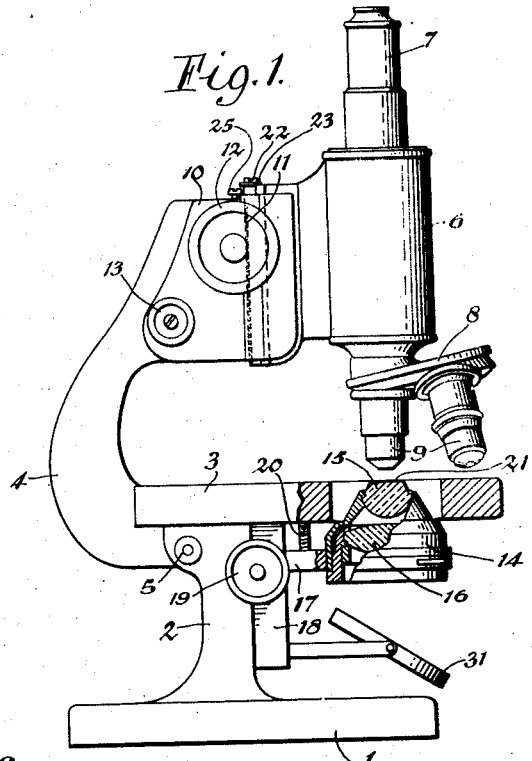
Fig. 1 is a side elevation partly in section of a microscope embodying one form of the invention.

Referring more particularly to the drawing in which similar reference characters designate corresponding parts throughout the several views, the microscope shown in Fig. 1 embodying the invention comprises a base 1 having an upright support 2 on which is supported the stage 3 and the upright supporting arm 4 which is pivotally mounted at 5 and supports the body tube assembly 6 which carries the focusing eyepiece 7 and rotatable objective support 8 supporting the objectives 9.

The body tube assembly 6 is adjustably supported on the front end 10 of the upright arm 4 through the rack 11 on the rear face of said assembly 6 and said assembly 6 is adapted to be adjusted by the coarse adjustment knob 12 which turns the pinion 12A to raise or lower the assembly 6 and the fine adjustment knob 13 which through the conventional fine adjustment arrangement adjusts the assembly 6 to desired position.

Underneath the stage 3 is the substage 14, containing the front lens 15 and bottom lens 16, and the reflector 31 for reflecting light from a light source to illuminate the object to be examined on the stage 3. This substage condenser is adjustably connected by the arm 17 to the rack member 18 which may be adjusted vertically by the knob 19 which turns a pinion to raise or lower the substage. The limit of upward movement of this substage condenser is limited by the screw 20 which hits the bottom of the stage when said condenser is at its upper limit to prevent the upper face 21 of the front lens of the condenser from projecting above the upper surface of the stage 3. It is preferable however that this stop be so adjusted that the upper surface 21 of the front lens of the substage condenser will be a small fraction such as two or three thousandths of an inch below the upper surface of the stage when the condenser is at its upper limit of adjustment.

Figure 2:
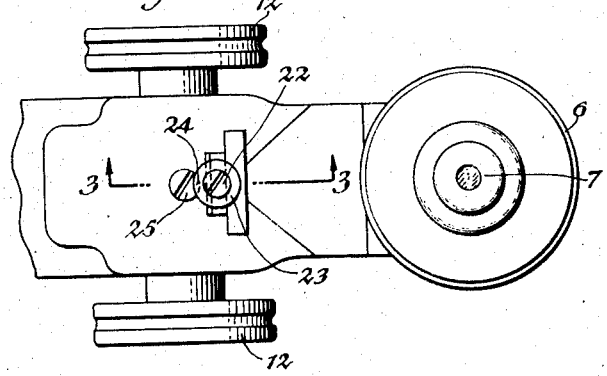
Fig. 2 is a top or plan view of a microscope embodying the form of invention shown in Fig. 1.
Figure 3:
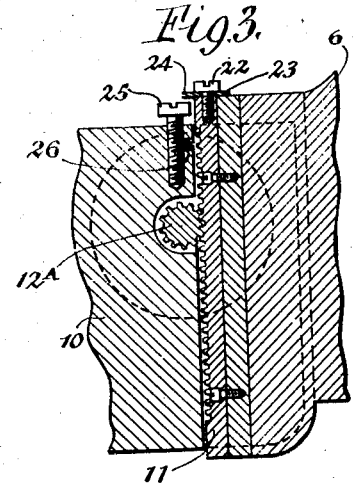
Fig. 3 is a sectional view taken on line 3—3 of Fig. 2 and looking in the direction of the arrows.

In the form of the invention shown in Figs. 1, 2 and 3 there is provided on the support for the body tube 6, and adjacent the rear upper edge thereof, a screw 22 which secures thereto the washer or the like 23 which has a portion 24 extending or projecting over the rear upper edge of said member and forming an outstanding lip. This lip may be formed as described above or by other means such as formed integral with said assembly 6 or secured thereto by solder, welding or the like. In the upper portion 10 of the arm 4 there is placed an adjustable member, for example, a screw or the like 25 adjacent the forward end of said member 10. This screw is threaded into an opening in the upper surface of said member 10 and adjacent the forward end thereof so that at least a portion thereof is adapted to underlie the projecting portion 24 of the washer member or the like 23. This screw 25 is adapted to be locked in adjusted position, for example, by means of the set screw or the like 26 although other locking means may be used such as a lock nut or collar as described hereinafter for the form of the invention shown in Fig. 4.

When the microscope has been assembled the body tube 6 is lowered by means of the coarse adjustment knob 12 and with the fine adjustment set at its lowest point through means of the knob 13 until the distance or space between the upper edge 21 of the front lens 15 of the substage condenser, which is placed at its highest point, and the lower edge of the longest objective is separated by a desired distance, we have found that a distance of one-quarter millimeter is satisfactory, and with the parts in this position the screw 25 is adjusted so that the lip or flange portion 24 will rest securely on the head of said screw 25 to prevent further downward movement of said body tube and objective. The body tube support is then removed and the set screw 26 tightened to securely lock said screw 25 in said adjusted position.

If, instead of employing the lock or set screw 26 a threaded lock nut or collar or the like is used, it will not be necessary to remove said assembly 6 to lock the screw or the like 25 in adjusted position.

It will be readily seen that by employing the micrometer stop adjustment device described above, the damage and expensive repairs caused by the hitting of the objective on the front lens of the substage condenser will be prevented and that this stop adjustment can be adjusted to compensate for the variations in the dimensions of the assembled instrument caused by variations in the parts of the instrument.

From the foregoing it will be seen that we have provided simple, efficient and economical means for obtaining all of the objects of the invention.

Having described our invention, we claim:

1. In a device of the character described, a supporting arm having a guideway in one face thereof, a member vertically adjustable in said guideway, and an adjustable threaded member threaded into the surface of said supporting arm adjacent said guideway, substantially in the direction of the longitudinal axis of the guideway, a second threaded member threaded into said vertically adjustable member adjacent said guideway and said first threaded member, one of said threaded members having a stop surface thereon and the other having means for engaging said stop surface for adjustably limiting the vertical movement of said vertically adjustable member.

2. In a device of the character described, a supporting arm having a forwardly extending portion, a guideway in the forward edge of said forwardly extending portion, a member vertically adjustable in said guideway, a threaded member threaded into the upper surface of said forwardly extending portion adjacent said guideway, a second threaded member threaded into said body member adjacent the portion thereof in said guideway and means on said second threaded member adapted to engage said first threaded member to limit the vertical movement of said body member.

KENNARD W. HARPER.
ERWIN O. ROEDER.